United States Patent
DeLuca et al.

(10) Patent No.: US 10,574,722 B2
(45) Date of Patent: Feb. 25, 2020

(54) ADDING CONTEXTUAL CLARITY TO SHARED LINKS

(71) Applicant: International Business Machines Corporation, Armonk, NY (US)

(72) Inventors: Lisa Seacat DeLuca, Baltimore, MD (US); Dana L. Price, Surf City, NC (US); Aaron J. Quirk, Cary, NC (US); Shelbee D. Smith-Eigenbrode, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 15/150,019

(22) Filed: May 9, 2016

(65) Prior Publication Data
US 2017/0324800 A1  Nov. 9, 2017

(51) Int. Cl.
*H04L 29/08* (2006.01)
(52) U.S. Cl.
CPC ..................... *H04L 67/02* (2013.01)
(58) Field of Classification Search
CPC ..... H04L 41/12; H04L 67/1097; H04L 67/02; H04L 51/08; H04L 67/22; H04L 61/6072; G06F 3/0605; G06F 3/0619; G06F 3/0635; G06F 3/0655; G06F 3/067; G06F 3/0679; G06F 9/4416; G06F 11/202; G06F 11/2046; G06F 13/4045; G06F 17/30887; H05K 7/1438; G06Q 30/0631; Y10S 707/99936
USPC .................................................. 709/223, 218
See application file for complete search history.

(56) References Cited

U.S. PATENT DOCUMENTS

| | | | |
|---|---|---|---|
| 6,484,196 B1 * | 11/2002 | Maurille | H04L 12/1831 370/260 |
| 7,293,012 B1 | 11/2007 | Solaro et al. | |
| 8,281,232 B2 | 10/2012 | Vishria et al. | |
| 8,812,737 B2 | 8/2014 | Bilinski et al. | |
| 2011/0264992 A1 * | 10/2011 | Vishria | G06F 17/30887 715/208 |
| 2012/0047577 A1 | 2/2012 | Costinsky | |
| 2014/0163954 A1 * | 6/2014 | Joshi | G06F 3/0237 704/9 |
| 2015/0106225 A1 * | 4/2015 | Glass | G06Q 20/12 705/26.7 |
| 2015/0370899 A1 * | 12/2015 | Jung | G06F 17/30864 707/722 |

OTHER PUBLICATIONS ip.com, "Contextual URL Shortener", IP.com, Nov. 28, 2012, 3 pages.
Sebastien, "A First Silex Project", <sf.khepin.com>, Apr. 13, 2011, 18 pages.

* cited by examiner

*Primary Examiner* — Tan Doan
(74) *Attorney, Agent, or Firm* — Jamar K. Ray

(57) ABSTRACT

Methods and systems may provide for detecting a sharing event with respect to an original uniform resource locator (URL) and replacing one or more characters of the original URL with a context attribute of the sharing event to obtain a modified URL. Additionally, a user prompt may be generated, wherein the user prompt includes a recommendation to substitute the modified URL for the original URL. In one example, at least a portion of the context attribute is independent of a web page associated with the original URL.

24 Claims, 3 Drawing Sheets

ADDING CONTEXTUAL CLARITY TO SHARED LINKS

BACKGROUND

Embodiments generally relate to the sharing of links. More particularly, embodiments relate to the addition of contextual clarity to shared links.

When online, individuals may encounter web pages that may be of interest to others. In such a case, an individual might copy (e.g., via Ctrl-C key sequence, Command-C key sequence, mouse right-click, etc.) the uniform resource locator (URL) associated with the page of interest and paste the copied URL into a chat window or other communication interface. Many URLs, however, may contain a relatively large number of characters that are difficult to remember and might even prevent the URL from being pasted into character-limited interfaces. While link-shortening services may replace a portion of lengthy URLs with fewer characters, the replacement characters may still be cryptic and difficult to remember. As a result, the individuals involved in the sharing process may eventually be unable to view the shared page due to the URL being lost and/or forgotten.

BRIEF SUMMARY

Embodiments may include a link clarification system comprising a share detector to detect a sharing event with respect to an original uniform resource locator (URL), a context adapter communicatively coupled to the share detector, the context adapter to replace one or more characters of the original URL with a context attribute of the sharing event to obtain a modified URL, and a recommender communicatively coupled to the context adapter, the recommender to generate a user prompt that includes a recommendation to substitute the modified URL for the original URL.

Embodiments may also include a computer program product to clarify links, the computer program product comprising a computer readable storage medium having program instructions embodied therewith, the program instructions executable by a computer to cause the computer to detect a sharing event with respect to an original uniform resource locator (URL), wherein the sharing event is to include a user-initiated copy of the original URL, replace one or more characters of the original URL with a context attribute of the sharing event to obtain a modified URL, generate a user prompt that includes a recommendation to substitute the modified URL for the original URL, detect an acceptance of the recommendation, and map the modified URL to the original URL in response to the acceptance.

Embodiments may also include a method of clarifying links, comprising detecting a sharing event with respect to an original uniform resource locator (URL), wherein the sharing event includes a user-initiated copy of the original URL, replacing one or more characters of the original URL with a context attribute of the sharing event to obtain a modified URL, and mapping the modified URL to the original URL.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
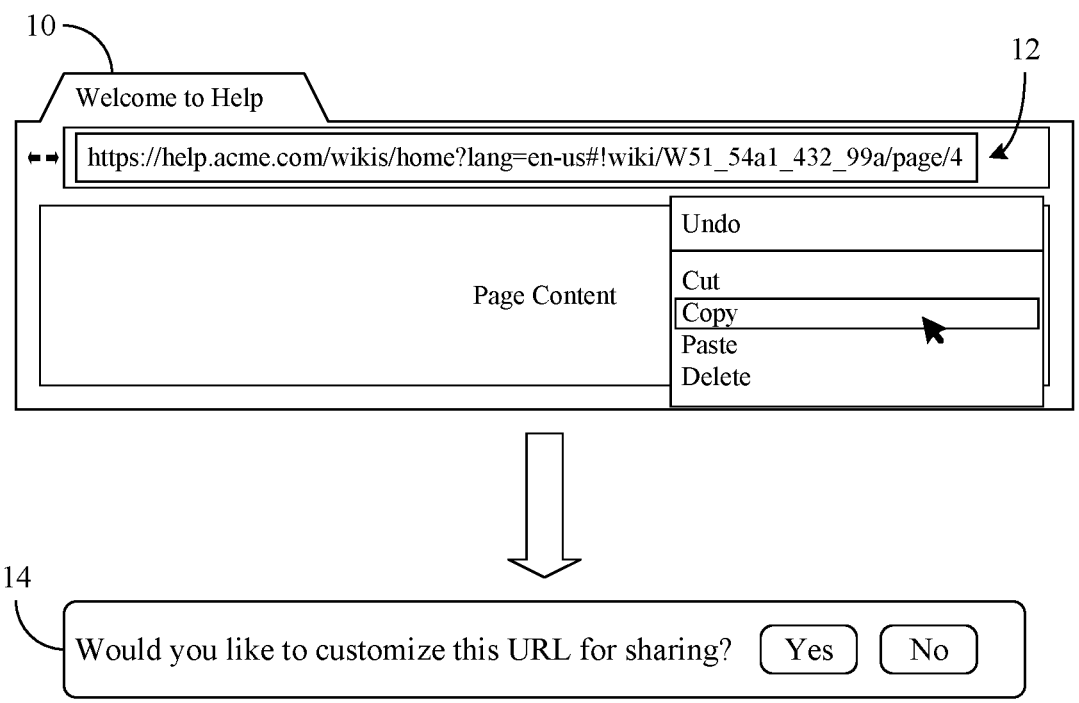
FIG. 1 is an illustration of an example of the triggering of a user prompt according to an embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, an online example is shown in which a user/individual visits a web page 10 that may be of interest to other individuals such as, for example, friends, family, coworkers, etc., of the user. In the illustrated example, the web page 10 is associated with an original uniform resource locator (URL) 12 that is relatively long and contains characters (e.g., "W51_54a1_432 . . . ") that may not be meaningful to the typical layperson. As a result, memorizing the original URL 12 may be difficult for both the user visiting the web page 10 and the other individuals with whom the user might share the original URL 12. Accordingly, the user may initiate a sharing event by copying the original URL 12 to a clip board and/or scratch pad maintained in the memory of the computing device that is used to display the web page 10. As will be discussed in greater detail, the sharing event, which may be associated with a collaborative application (e.g., social networking site, email application, chat application, text messaging application, teleconferencing application, etc.), may be detected and used to automatically provide the user with options to convert the original URL 12 into a modified URL that is easier for the individuals involved in the sharing event to remember. For example, an initial user prompt 14 may enable the user to opt-in to a URL customization option.

Figure 2:
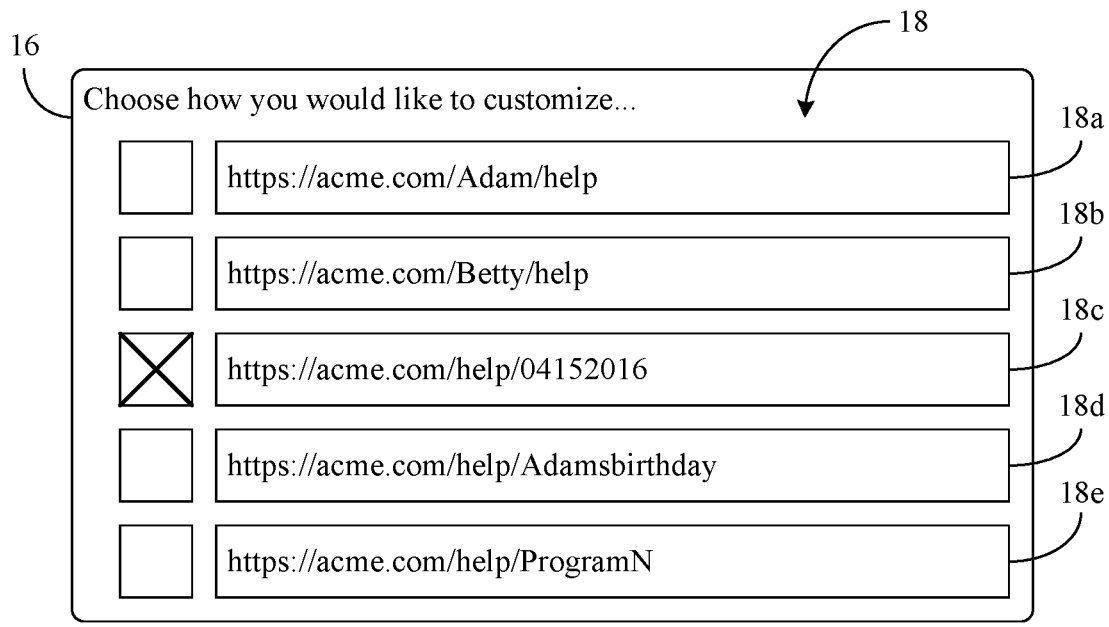
FIG. 2 is an illustration of an example of a set of recommendations according to an embodiment.

FIG. 2 demonstrates that if the user accepts the URL customization option, another user prompt 16 may be generated to present one or more modified URLs 18 (18a-18e) to the user. The modified URLs 18 may generally substitute one or more characters of the original URL 12 (FIG. 1) with context attributes of the sharing event. For example, a first modified URL 18a may have a context attribute that includes a sender name (e.g., "Adam") and a lower level domain (e.g., "help"). Similarly, a second modified URL 18b may have a context attribute that includes a recipient name (e.g., "Betty") and the lower level domain. The sender name and/or the recipient name may be determined from, for example, screen names in an authenticated web site environment (e.g., collaborative and/or social networking site), email delivery metadata (e.g., "to", "from", "Cc" and/or "Bcc" field data), chat interface screen names (e.g., instant messaging/IM window data), text messaging metadata (e.g., short messaging service/SMS sender and/or recipient data), teleconferencing metadata (e.g., meeting participant data), and so forth. Accordingly, one or more active programs other than the browser being used to view the web page 10 (FIG. 1) may be monitored to generate the context attributes. Moreover, the lower level domain may be extracted from the original URL 12 (FIG. 1).

In another example, a third modified URL 18c may have a context attribute that includes a date (e.g., "Apr. 15, 2016")

associated with the sharing event. Additionally, a fourth modified URL 18*d* may have a context attribute that includes a colloquial description (e.g., "Adamsbirthday") of the date associated with the sharing event. Other colloquial descriptions such as holidays, anniversaries, and so forth, may also be used to generate the context attribute. In yet another example, a fifth modified URL 18*e* may have a context attribute that includes an active program name (e.g., "ProgramN"), wherein the active program name might correspond to a particular email messaging application, JAVASCRIPT applet, IM application, text messaging application, teleconferencing application, and so forth. Thus, the active program name might be associated with the most active program and/or the most likely program to be associated with the sharing event.

Other link clarification examples may include copying a context attribute from a related URL and adding a trailing incremental value to the context attribute. For example, the if there are multiple web pages associated with the fifth modified URL 18*e*, a series of modified URLs might be generated as . . . /ProgramN/1, . . . /ProgramN/2, . . . /ProgramN/3, and so forth. Moreover, the order in which the modified URLs are presented may vary based on previous selections in order to present the most likely option to be chosen first. The initial user prompt 14 (FIG. 1) and the user prompt 16 may also be combined into a single prompt. Additionally, the mapping of one or more of the modified URLs 18 to the original URL may be conducted automatically so that the user prompt 16 and/or the user prompt 14 (FIG. 1) are not generated.

The user may complete the sharing event by, for example, pasting one of the modified URLs 18 into an interface (e.g., chat window, social networking post, email) associated with the collaborative application. Thus, each of the modified URLs 18 may be substantially easier to remember from the perspective of the individuals involved in the sharing event. For example, Betty might readily recall the first modified URL 18*a* by virtue of the fact that it was sent to her from Adam. As a result, Betty may be more likely to be able to type the modified URL 18*a* into a browser without having access to the link sent to her from Adam. Similarly, individuals in Adam's social network may readily recall the fourth modified URL 18*d* as being posted by Adam on his birthday. The illustrated solution may therefore significantly enhance the user experience with respect to shared links.

Of particular note is that at least a portion of the context attributes may be independent of the web page 10 (FIG. 1) associated with the original URL 12. In this regard, the page content may be extensive and complex, which may in turn present challenges with regard to remembering the correct portion of the page content as well as analyzing the page content to determine the most appropriate context attribute to use. Rather, by focusing the context attribute on the sharing event itself, the illustrated solution simplifies the link clarification process from both the perspective of the users and the link clarification system.

Figure 3:
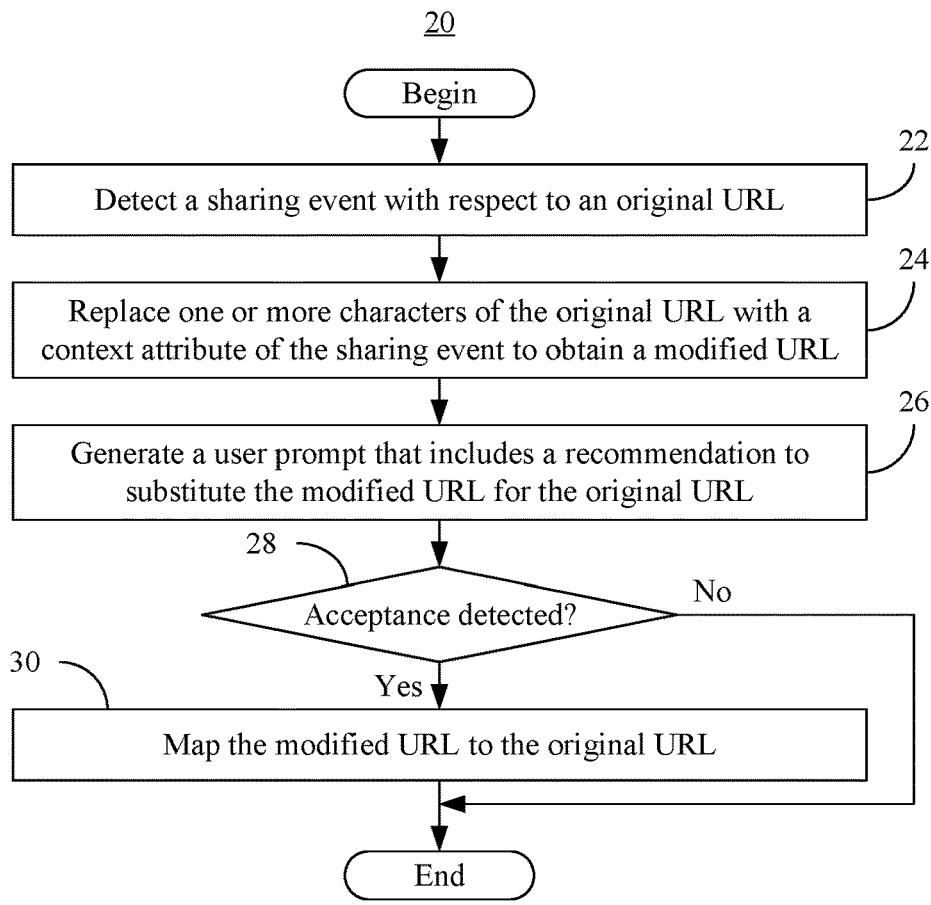
FIG. 3 is a flowchart of an example of a method of clarifying links according to an embodiment.

FIG. 3 shows a method 20 of clarifying links. The method 20 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 22 may provide for detecting a sharing event with respect to an original URL. As already noted, the sharing event may include a user-initiated copy of the original URL (e.g., while a collaborative application is active). Block 22 may therefore involve monitoring key strokes, mouse clicks, system interrupts, browser calls, etc., in order to automatically detect the sharing event. One or more characters of the original URL may be replaced at block 24 with a context attribute of the sharing event to obtain a modified URL. The context attribute may include, for example, a sender name, a recipient name, an active program name, a date, a colloquial description of a date, and so forth. Moreover, at least a portion of the context attribute may be independent of the web page associated with the original URL. Block 24 may include extracting the context attribute from the original URL. In another example, block 24 may include copying the context attribute from a related URL and adding an incremental value to the context attribute. Moreover, block 24 may take into consideration prior recommendation results and learn over time what types of context attributes are likely to be accepted by the user. For example, if the user typically accepts the name of the recipient as the context attribute under certain circumstances (e.g., when composing an email), block 24 might present such a modified URL as a first option when those circumstances arise.

Block 26 may generate a user prompt such as, for example, the prompt 16 (FIG. 2), wherein the user prompt includes a recommendation to substitute the modified URL for the original URL. If an acceptance of the recommendation is detected at block 28, illustrated block 30 maps the modified URL to the original URL. Block 30 may therefore involve sending the modified URL to one or more domain name system (DNS) servers responsible for translating and/or redirecting URLs to Internet Protocol (IP) addresses. If block 28 does not detect an acceptance of the recommendation, the illustrated method 20 bypasses block 30 and terminates. Additionally, the mapping of the modified URL to the original URL at block 30 may be conducted automatically. In such a case, blocks 26 and 28 may be bypassed.

Figure 4:
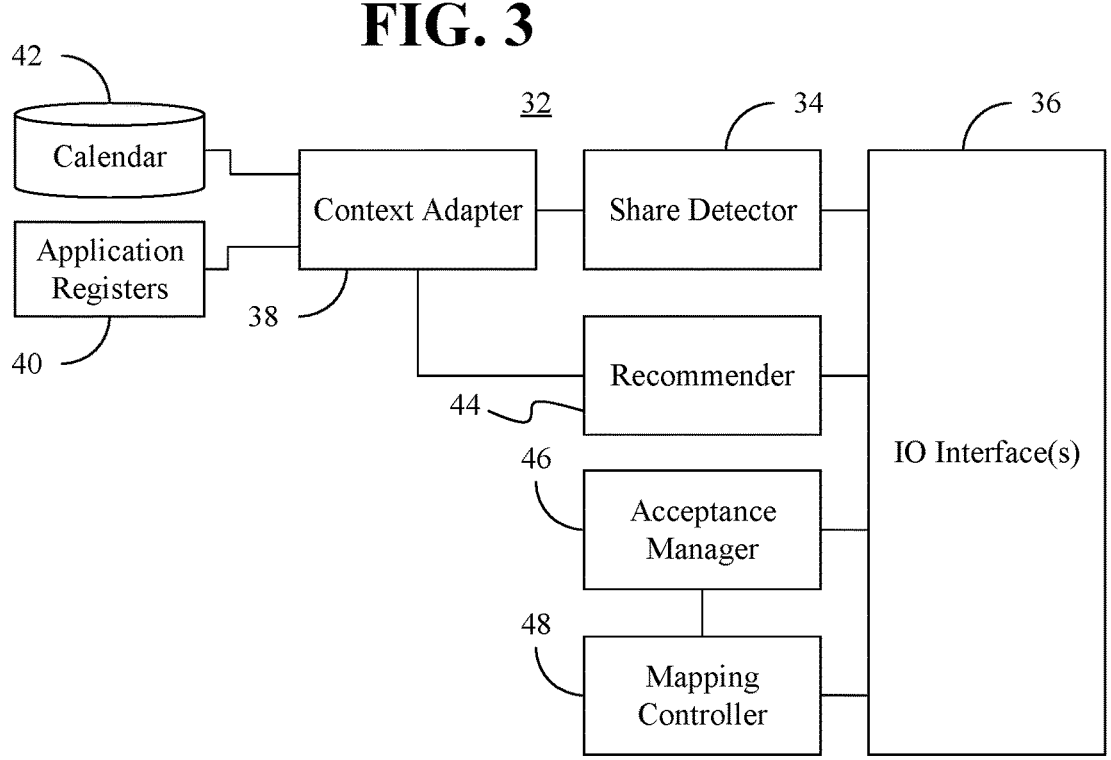
FIG. 4 is a block diagram of an example of a clarification apparatus according to an embodiment.

FIG. 4 shows a link clarification apparatus 32 that may implement one or more aspects of the method 20 (FIG. 3), already discussed. Accordingly, the apparatus 32 may include fixed-functionality hardware, configurable logic, logic instructions, etc., or any combination thereof. In the illustrated example, a share detector 34 is coupled to one or more input/output (IO) interfaces 36, wherein the one or more IO interfaces 36 may include, for example, a network controller (e.g., wireless and/or wired), a human interface device (HID, e.g., touchscreen controller), etc., or any combination thereof. The share detector 34 may detect a sharing event with respect to an original URL. The sharing event may include, for example, a user-initiated copy of the original URL.

The apparatus 32 may also include a context adapter 38 communicatively coupled to the share detector 34, wherein the context adapter 38 replaces one or more characters of the original URL with a context attribute of the sharing event to obtain a modified URL. At least a portion of the context attribute may be independent of a web page associated with the original URL. The context attribute may be selected from, for example, a group consisting of a sender name and a recipient name. The context attribute may also include an active program name. In this regard, the context adapter 38 may be coupled to one or more application registers 40 or other application data sources that indicate the state and/or level of activity of applications running on the platform. The context attribute may also include a date or a colloquial description (e.g., birthday, anniversary, holiday) of a date associated with the sharing event. In this regard, the context adapter 38 may be coupled to a calendar database 42 that provides such descriptions of dates and/or times. The context adapter 38 may also extract the context attribute from the original URL. In another example, the context adapter 38 may copy the context attribute from a related URL and add a trailing incremental value to the context attribute. While the modified URL may typically be shorter than the original URL, other examples may include appending or inserting characters in order to make the modified URL more memorable. For example, " . . . projectxyz.com/<hostname>" might be changed to " . . . projectxyz.com/Adam<hostname>" in such a case.

The illustrated apparatus 32 also includes a recommender 44 communicatively coupled to the context adapter 38 and the IO interface(s) 36. The recommender 44 may generate one or more user prompts that include a recommendation, or set of recommendations, to substitute the modified URL for the original URL. Moreover, an acceptance manager 46 may detect an acceptance of the recommendation, wherein a mapping controller 48 may map the modified URL to the original URL in response to the acceptance.

Figure 5:
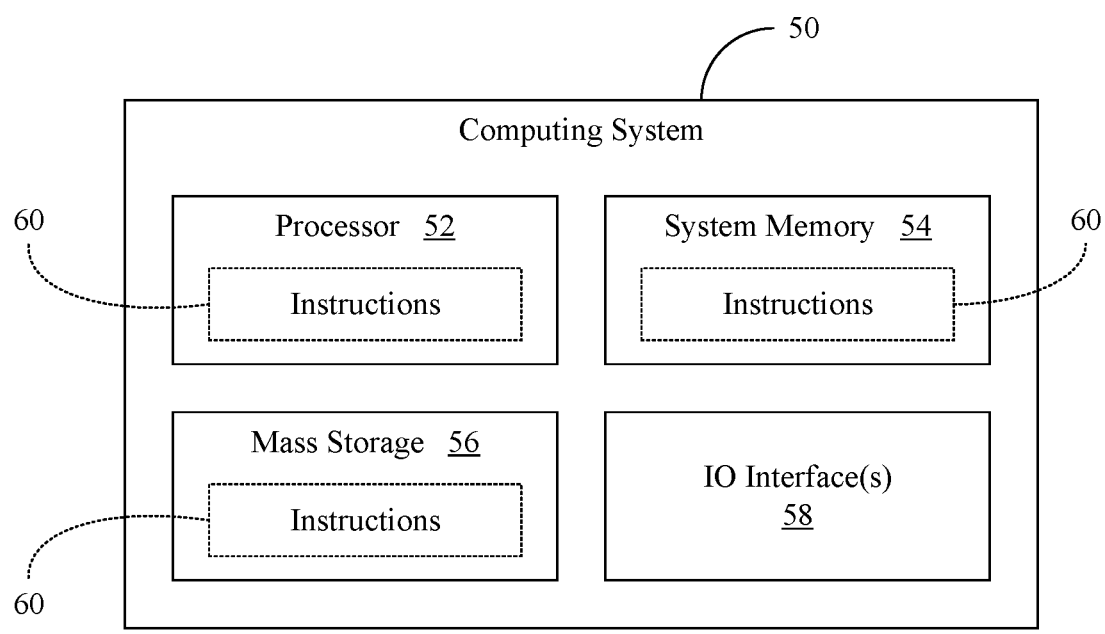
FIG. 5 is a block diagram of an example of a computing system according to an embodiment.

Turning now to FIG. 5, a computing system 50 is shown. The computing system 50 may generally include a processor 52, system memory 54 (e.g., dynamic random access memory/DRAM), mass storage 56 (e.g., hard disk drive/HDD, optical disk, solid state drive/SSD, flash memory) and one or more IO interfaces 58 such as, for example, the IO interfaces 36 (FIG. 4). In the illustrated example, program instructions 60 may be executed on the processor 52 in order to implement one or more aspects of the method 20 (FIG. 3), already discussed. Thus, the program instructions 60 may detect a sharing event with respect to an original URL, replace one or more characters of the original URL with a context attribute of the sharing event to obtain a modified URL, and generate a user prompt that includes a recommendation to substitute the modified URL for the original URL. The instructions 60 may also detect an acceptance of the recommendation and map the modified URL to the original URL in response to the acceptance.

The instructions 60 may include structural components that are native to the processor 52, retrieved from the system memory 54 for execution by the processor 52, retrieved from the mass storage 56 for execution by the processor 52, etc., or any combination thereof. The computing system 50 may include a server, desktop computer, notebook computer, tablet computer, convertible tablet, handheld device, media player, and so forth.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A method comprising:
   detecting a sharing event with respect to an original uniform resource locator (URL) corresponding to a web page, wherein the sharing event includes a user-initiated copy of the original URL;
   replacing one or more characters of the original URL with a context attribute of the sharing event to obtain a modified URL having the context attribute displayed in the modified URL, wherein characters of at least a part of an original host portion of the original URL are to be positioned at a host portion of the modified URL, wherein at least a part of the context attribute is to be independent of a web page associated with the original URL, and wherein characters of at least a part of the context attribute are to be positioned at a path portion of the modified URL and include a sender name of a user that executes the user-initiated copy, a recipient name of a recipient that receives the modified URL, and an active program name associated with a program corresponding to a collaborative application associated with the sharing event; and
   sharing the modified URL via the collaborative application.

2. The method of claim 1, further including:
   generating a user prompt that includes a recommendation to substitute the modified URL for the original URL; and
   detecting an acceptance of the recommendation, wherein the modified URL is mapped to the original URL in response to the acceptance.

3. The method of claim 1, further including extracting a character of the context attribute from the original URL for the modified URL.

4. The method of claim 1, further including:
   copying the context attribute from a related modified URL; and
   adding an incremental value to the context attribute.

5. The method of claim 1, wherein a first context attribute of a first modified URL includes the sender name, a second context attribute of a second modified URL includes the recipient name, a third context attribute of a third modified URL includes the active program name, a fourth context attribute of a fourth modified URL includes a date associated with the sharing event, and a fifth context attribute of a fifth modified URL includes a colloquial description of the date.

6. A system comprising a hardware processor configured to:
   detect a sharing event with respect to an original uniform resource locator (URL) corresponding to a web page;
   replace one or more characters of the original URL with a context attribute of the sharing event to obtain a modified URL having the context attribute displayed in the modified URL, wherein characters of at least a part of an original host portion of the original URL are to be positioned at a host portion of the modified URL, wherein at least a part of the context attribute is to be independent of a web page associated with the original URL, and wherein characters of at least a part of the context attribute are to be positioned at a path portion of the modified URL and include a sender name of a user that executes the user-initiated copy, a recipient name of a recipient that receives the modified URL, and an active program name associated with a program corresponding to a collaborative application associated with the sharing event;

generate a user prompt that includes a recommendation to substitute the modified URL for the original URL; and share the modified URL via the collaborative application.

7. The system of claim 6, wherein the hardware processor is configured to:

detect an acceptance of the recommendation; and map the modified URL to the original URL in response to the acceptance.

8. The system of claim 6, wherein a first context attribute of a first modified URL is to include the sender name, a second context attribute of a second modified URL is to include the recipient name, a third context attribute of a third modified URL is to include the active program name, a fourth context attribute of a fourth modified URL is to include a date associated with the sharing event, and a fifth context attribute of a fifth modified URL is to include a colloquial description of the date.

9. The system of claim 6, wherein the hardware processor is configured to extract a character of the context attribute from the original URL for the modified URL.

10. The system of claim 6, wherein the hardware processor is configured to copy the context attribute from a related modified URL and add an incremental value to the context attribute.

11. The system of claim 6, wherein the sharing event is to include a user-initiated copy of the original URL and the sharing event is to be associated with the collaborative application, wherein the collaborative application is selected from a group consisting of a social networking site, an email application, a chat application a text messaging application and a teleconferencing application.

12. The system of claim 6, wherein the hardware processor is configured to determine the sender name and the recipient name using data selected from a group consisting of a screen name and collaborative application metadata.

13. The system of claim 12, wherein one or more of the sender name or the recipient name is to be automatically determined from a screen name used by the sender or the recipient in the collaborative application.

14. The system of claim 13, wherein the screen name is used by the sender or the recipient in one or more of a collaborative web site or a social networking web site.

15. The system of claim 13, wherein the screen name is used by the sender or the recipient in a real-time chat message window.

16. The system of claim 12, wherein the collaborative application metadata is selected from a group consisting of email delivery metadata, text messaging metadata, and teleconferencing metadata.

17. The system of claim 16, wherein the screen name used by the sender or the recipient is determined from address field data of email delivery metadata, sender or recipient data of the text messaging metadata, and participant data of the teleconferencing metadata.

18. The system of claim 6, wherein the hardware processor is configured to add a first incremental value corresponding to a first web page in a first modified URL of a series of related modified URLs and is to add a second incremental value corresponding to a second web page in a second modified URL of the series of related modified URLs.

19. The system of claim 6, wherein the collaborative application is to accept a paste of the modified URL by the user that executes the user-initiated copy to complete the sharing event.

20. The system of claim 6, wherein the hardware processor is configured to consider prior recommendation results to learn types of context attributes over time that are to be accepted by the user that executes the user-initiated copy.

21. A computer program product to clarify links, the computer program product comprising a computer readable storage medium having program instructions embodied therewith, the program instructions executable by a computer to cause the computer to:

detect a sharing event with respect to an original uniform resource locator (URL) corresponding to a web page, wherein the sharing event is to include a user-initiated copy of the original URL;

replace one or more characters of the original URL with a context attribute of the sharing event to obtain a modified URL having the context attribute displayed in the modified URL, wherein characters of at least a part of an original host portion of the original URL are to be positioned at a host portion of the modified URL, wherein at least a part of the context attribute is to be independent of a web page associated with the original URL, and wherein characters of at least a part of the context attribute are to be positioned at a path portion of the modified URL and include a sender name of a user that executes the user-initiated copy, a recipient name of a recipient that receives the modified URL, and an active program name associated with a program corresponding to a collaborative application associated with the sharing event;

generate a user prompt that includes a recommendation to substitute the modified URL for the original URL;

detect an acceptance of the recommendation;

map the modified URL to the original URL in response to the acceptance; and share the modified URL via the collaborative application.

22. The computer program product of claim 21, wherein a first context attribute of a first modified URL is to include the sender name, a second context attribute of a second modified URL is to include the recipient name, a third context attribute of a third modified URL is to include the active program name, a fourth context attribute of a fourth modified URL is to include a date associated with the sharing event, and a fifth context attribute of a fifth modified URL is to include a colloquial description of the date.

23. The computer program product of claim 21, wherein the program instructions, when executed, cause a computing device to extract a character of the context attribute from the original URL for the modified URL.

24. The computer program product of claim 21, wherein the program instructions, when executed, cause a computing device to:

copy the context attribute from a related modified URL; and add an incremental value to the context attribute.

* * * * *